(12) United States Patent
Pike

(10) Patent No.: US 12,393,661 B2
(45) Date of Patent: Aug. 19, 2025

(54) SYSTEMS AND METHODS FOR SECURE DATA INPUT AND AUTHENTICATION

(71) Applicants: LICENTIA GROUP LIMITED, South Glamorgan (GB); MYPINPAD LIMITED, South Glamorgan (GB)

(72) Inventor: Justin Pike, Gwent (GB)

(73) Assignees: Licentia Group Limited, Cardiff (GB); MyPinPad Limited, Cardiff (GB)

( * ) Notice: Subject to any disclaimer, the term of this patent is extended or adjusted under 35 U.S.C. 154(b) by 182 days.

(21) Appl. No.: 17/775,677

(22) PCT Filed: Nov. 9, 2020

(86) PCT No.: PCT/IB2020/060521
§ 371 (c)(1),
(2) Date: May 10, 2022

(87) PCT Pub. No.: WO2021/094894
PCT Pub. Date: May 20, 2021

(65) Prior Publication Data
US 2022/0374507 A1   Nov. 24, 2022

(30) Foreign Application Priority Data
Nov. 12, 2019  (GB) ..................... 1916441

(51) Int. Cl.
G06F 21/00   (2013.01)
G06F 21/33   (2013.01)
G06F 21/53   (2013.01)

(52) U.S. Cl.
CPC ............. G06F 21/33 (2013.01); G06F 21/53 (2013.01); *G06F 2221/034* (2013.01)

(58) Field of Classification Search
None
See application file for complete search history.

(56) References Cited

U.S. PATENT DOCUMENTS

| 2,819,067 A | 1/1958 | Dusenbury |
| 3,176,324 A | 4/1965 | Birgbauer, Sr. |

(Continued)

FOREIGN PATENT DOCUMENTS

| CN | 100583113 C | 3/2005 |
| CN | 101082948 A | 12/2007 |

(Continued)

OTHER PUBLICATIONS

Papadopoulos, Athanasios et al. IllusionPIN: Shoulder-Surfing Resistant Authentication Using Hybrid Images. IEEE Transactions on Information Forensics and Security, vol. 12, Issue: 12. https://ieeexplore.ieee.org/stamp/stamp.jsp?tp=&arnumber=7972980 (Year: 2017).*

(Continued)

*Primary Examiner* — Jeremiah L Avery
(74) *Attorney, Agent, or Firm* — Gordon & Jacobson, P.C.

(57) ABSTRACT

Improved methods and systems for secure data entry and/or authentication of a user are provided. A preferred method of the invention comprises: selecting a keypad zone within an area of a display zone of a touch screen which comprises a plurality of hotspots that implement the keys of an operable keypad; providing an image of a keypad at the same location as the keypad zone such that the keypad image covers the operable keys within the keypad zone and the keypad image functions as a visible mask or cover over the operable keys of the keypad zone; a new keypad zone is selected at a different location within the display zone when the process is subsequently repeated, such that the keypad zone and the image are re-positioned to provide an operable keypad and overlaid, masking keypad image in a new area of the screen.

13 Claims, 3 Drawing Sheets

(56) References Cited

U.S. PATENT DOCUMENTS

| | | |
|---|---|---|
| 3,201,732 A | 8/1965 | Olsen |
| 3,255,323 A | 6/1966 | Austin |
| 3,270,720 A | 9/1966 | Ehrhardt |
| 3,347,103 A | 10/1967 | High |
| 3,364,601 A | 1/1968 | Korenek |
| 3,375,428 A | 3/1968 | Mitchell |
| 3,392,846 A | 7/1968 | Getzin |
| 3,413,071 A | 11/1968 | Davis |
| 3,621,242 A | 11/1971 | Ferguson |
| 3,762,876 A | 10/1973 | Koehler |
| 3,965,066 A | 6/1976 | Sterman |
| 5,157,717 A | 10/1992 | Hitchcock |
| 5,193,152 A | 3/1993 | Smith |
| 5,209,102 A | 5/1993 | Wang |
| 5,219,794 A | 6/1993 | Satoh |
| 5,234,389 A | 8/1993 | Goates |
| 5,257,486 A | 11/1993 | Holmwall |
| 5,363,449 A | 11/1994 | Bestock |
| 5,434,702 A | 7/1995 | Byron |
| 5,504,808 A | 4/1996 | Hamrick, Jr. |
| 5,549,194 A | 8/1996 | Dag |
| 5,715,078 A | 2/1998 | Shiraishi |
| 5,754,652 A | 5/1998 | Wilfong |
| 5,949,348 A | 9/1999 | Kapp |
| 5,990,586 A | 11/1999 | Milano, Jr. |
| 6,193,152 B1 | 2/2001 | Fernando |
| 6,209,102 B1 | 3/2001 | Hoover |
| 6,219,794 B1 | 4/2001 | Soutar |
| 6,234,389 B1 | 5/2001 | Valliani |
| 6,257,486 B1 | 7/2001 | Teicher |
| 6,434,702 B1 | 8/2002 | Maddalozzo, Jr. |
| 6,549,194 B1 | 4/2003 | McIntyre |
| 6,630,928 B1 | 10/2003 | McIntyre |
| 6,671,405 B1 | 12/2003 | Savakis |
| 6,715,078 B1 | 3/2004 | Chasko |
| 6,990,586 B1 | 1/2006 | Tresser |
| 7,003,316 B1 | 2/2006 | Elias |
| 7,010,806 B2 | 3/2006 | Bender |
| 7,047,222 B1 | 5/2006 | Bush |
| 7,091,845 B2 | 8/2006 | Midland |
| 7,092,915 B2 | 8/2006 | Best |
| 7,243,237 B2 | 7/2007 | Peinado |
| 7,305,565 B1 | 12/2007 | Lungaro |
| 7,395,506 B2 | 7/2008 | Tan |
| 7,698,563 B2 | 4/2010 | Shin |
| 7,735,121 B2 | 6/2010 | Madani |
| 7,992,007 B2 | 8/2011 | Lazzaro |
| 8,117,458 B2 | 2/2012 | Osborn, III |
| 8,176,324 B1 | 5/2012 | Krishnamurthy |
| 8,201,732 B1 | 6/2012 | Kropf |
| 8,255,323 B1 | 8/2012 | Casey |
| 8,270,720 B1 | 9/2012 | Ladd |
| 8,297,173 B1 | 10/2012 | Teetzel |
| 8,347,103 B2 | 1/2013 | Jones |
| 8,364,601 B2 | 1/2013 | Dewan |
| 8,375,428 B2 | 2/2013 | Won |
| 8,392,846 B2 | 3/2013 | Carapelli |
| 8,413,071 B2 | 4/2013 | Kim |
| 8,453,027 B2 | 5/2013 | Bartz |
| 8,453,207 B1 | 5/2013 | White |
| 8,621,242 B2 | 12/2013 | Brown |
| 8,762,876 B2 | 6/2014 | Puppin |
| 8,965,066 B1 | 2/2015 | Derakhshani |
| 9,082,253 B1 | 7/2015 | Harty |
| 9,235,967 B1 | 1/2016 | Magee |
| 9,448,620 B2 * | 9/2016 | Kim ............... G06F 3/0304 |
| 9,552,465 B2 | 1/2017 | Pike |
| 9,576,411 B2 | 2/2017 | Kim |
| 9,928,501 B1 | 3/2018 | Edwards |
| 9,947,012 B2 | 4/2018 | Smith |
| 10,027,684 B1 * | 7/2018 | Paterson ............ H04L 63/126 |
| 10,108,796 B2 | 10/2018 | Lo |
| 10,366,215 B2 | 7/2019 | Pike |
| 11,036,845 B2 | 6/2021 | Pike |
| 2002/0016918 A1 | 2/2002 | Tucker |
| 2002/0023215 A1 | 2/2002 | Wang |
| 2002/0029342 A1 | 3/2002 | Keech |
| 2002/0046185 A1 | 4/2002 | Villart |
| 2002/0082962 A1 | 6/2002 | Farris |
| 2002/0012397 A1 | 9/2002 | Hodgson |
| 2002/0129250 A1 | 9/2002 | Kimura |
| 2002/0188872 A1 | 12/2002 | Willeby |
| 2003/0002667 A1 | 1/2003 | Gougeon |
| 2003/0004877 A1 | 1/2003 | Kasasaku |
| 2003/0120612 A1 | 6/2003 | Fujisawa |
| 2003/0120936 A1 | 6/2003 | Farris |
| 2003/0132918 A1 | 7/2003 | Fitch |
| 2003/0212327 A1 | 11/2003 | Wang |
| 2003/0229597 A1 | 12/2003 | De Jong |
| 2003/0229598 A1 | 12/2003 | De Jong |
| 2003/0229791 A1 | 12/2003 | De Jong |
| 2004/0010690 A1 | 1/2004 | Shin |
| 2004/0039933 A1 | 2/2004 | Martin |
| 2004/0044739 A1 | 3/2004 | Ziegler |
| 2004/0073809 A1 | 4/2004 | Wing Keong |
| 2004/0122768 A1 | 6/2004 | Creamer |
| 2004/0122771 A1 | 6/2004 | Celi |
| 2004/0182921 A1 | 9/2004 | Dickson |
| 2005/0010786 A1 | 1/2005 | Michener |
| 2005/0012715 A1 | 1/2005 | Ford |
| 2005/0036611 A1 | 2/2005 | Seaton |
| 2005/0043997 A1 | 2/2005 | Sahota |
| 2005/0075973 A1 | 4/2005 | Yousofi |
| 2005/0127156 A1 | 6/2005 | Yoo |
| 2005/0127158 A1 | 6/2005 | Figueras |
| 2005/0140832 A1 | 6/2005 | Goldman |
| 2005/0144449 A1 | 6/2005 | Voice |
| 2005/0146447 A1 | 7/2005 | Na |
| 2005/0177522 A1 | 8/2005 | Williams |
| 2005/0193208 A1 | 9/2005 | Charrette, III |
| 2005/0212763 A1 | 9/2005 | Okamura |
| 2006/0003706 A1 | 1/2006 | Welland |
| 2006/0017691 A1 | 1/2006 | Cruz-Hernandez |
| 2006/0018467 A1 | 1/2006 | Steinmetz |
| 2006/0026440 A1 | 2/2006 | Sauvebois |
| 2006/0032705 A1 | 2/2006 | Isham |
| 2006/0037067 A1 | 2/2006 | Morris |
| 2006/0053301 A1 | 3/2006 | Shin |
| 2006/0104446 A1 | 5/2006 | Varghese |
| 2006/0133597 A1 | 6/2006 | Song |
| 2006/0136334 A1 | 6/2006 | Atkinson |
| 2006/0146169 A1 | 7/2006 | Segman |
| 2006/0149845 A1 | 7/2006 | Malin |
| 2006/0155619 A1 | 7/2006 | Rhiando |
| 2006/0182715 A1 | 8/2006 | Sandrock |
| 2006/0206919 A1 | 9/2006 | Montgomery |
| 2006/0221059 A1 | 10/2006 | Choi |
| 2006/0224523 A1 | 10/2006 | Elvitigala |
| 2006/0247533 A1 | 11/2006 | Abe |
| 2007/0005500 A1 | 1/2007 | Steeves |
| 2007/0011466 A1 | 1/2007 | Imura |
| 2007/0014415 A1 | 1/2007 | Harrison |
| 2007/0073937 A1 | 3/2007 | Feinberg |
| 2007/0089164 A1 | 4/2007 | Gao |
| 2007/0101150 A1 | 5/2007 | Oda |
| 2007/0110224 A1 | 5/2007 | Gumpel |
| 2007/0182715 A1 | 8/2007 | Fyke |
| 2007/0209014 A1 | 9/2007 | Youmtoub |
| 2007/0213090 A1 | 9/2007 | Holmberg |
| 2007/0279391 A1 | 12/2007 | Marttila |
| 2007/0282756 A1 | 12/2007 | Dravenstott |
| 2008/0011098 A1 | 1/2008 | Herremans |
| 2008/0014818 A1 | 1/2008 | Privitera |
| 2008/0024088 A1 | 1/2008 | Henry |
| 2008/0110981 A1 | 5/2008 | DeLine |
| 2008/0148186 A1 | 6/2008 | Krishnamurthy |
| 2008/0165035 A1 | 7/2008 | Bhella |
| 2008/0168546 A1 | 7/2008 | Almeida |
| 2008/0172735 A1 | 7/2008 | Gao |
| 2008/0184036 A1 | 7/2008 | Kavsan |
| 2008/0209223 A1 | 8/2008 | Nandy |
| 2008/0251969 A1 | 10/2008 | Isham |
| 2008/0280652 A1 | 11/2008 | Marry |
| 2008/0289035 A1 | 11/2008 | Delia |

(56) References Cited

U.S. PATENT DOCUMENTS

| | | | |
|---|---|---|---|
| 2008/0306995 A1 | 12/2008 | Newell | |
| 2008/0319902 A1 | 12/2008 | Chazan | |
| 2009/0033522 A1 | 2/2009 | Skillman | |
| 2009/0044282 A1 | 2/2009 | Govindaraju | |
| 2009/0066660 A1 | 3/2009 | Ure | |
| 2009/0067627 A1 | 3/2009 | Hogl | |
| 2009/0077383 A1 | 3/2009 | De Monseignat | |
| 2009/0106827 A1 | 4/2009 | Cerruti | |
| 2009/0183098 A1 | 7/2009 | Casparian | |
| 2009/0193210 A1 | 7/2009 | Hewett | |
| 2009/0213132 A1 | 8/2009 | Kargman | |
| 2009/0235199 A1 | 9/2009 | Mastie | |
| 2009/0254986 A1 | 10/2009 | Harris | |
| 2009/0270078 A1 | 10/2009 | Nam | |
| 2009/0277968 A1 | 11/2009 | Walker | |
| 2009/0328197 A1 | 12/2009 | Newell | |
| 2010/0036783 A1 | 2/2010 | Rodriguez | |
| 2010/0049768 A1 | 2/2010 | Robert | |
| 2010/0098300 A1 | 4/2010 | Otto | |
| 2010/0109920 A1 | 5/2010 | Spradling | |
| 2010/0117792 A1 | 5/2010 | Faith | |
| 2010/0121737 A1 | 5/2010 | Yoshida | |
| 2010/0125509 A1 | 5/2010 | Kranzley | |
| 2010/0138666 A1 | 6/2010 | Adams | |
| 2010/0149100 A1 | 6/2010 | Meiby | |
| 2010/0153270 A1 | 6/2010 | Hawkes | |
| 2010/0174653 A1 | 7/2010 | Tian | |
| 2010/0175016 A1 | 7/2010 | Tian | |
| 2010/0180336 A1 | 7/2010 | Jones | |
| 2010/0182244 A1 | 7/2010 | Onda | |
| 2010/0186076 A1 | 7/2010 | Ali | |
| 2010/0215270 A1 | 8/2010 | Manohar | |
| 2010/0223663 A1 | 9/2010 | Morimoto | |
| 2010/0242104 A1 | 9/2010 | Wankmueller | |
| 2010/0259561 A1 | 10/2010 | Forutanpour | |
| 2010/0287097 A1 | 11/2010 | Treadwell | |
| 2010/0287382 A1 | 11/2010 | Gyorffy | |
| 2010/0306283 A1 | 12/2010 | Johnson | |
| 2010/0323617 A1 | 12/2010 | Hubinak | |
| 2011/0004769 A1 | 1/2011 | Won | |
| 2011/0018033 A1 | 1/2011 | Takenaka | |
| 2011/0020414 A1 | 1/2011 | Kunin | |
| 2011/0029971 A1 | 2/2011 | Yamasaki | |
| 2011/0055084 A1 | 3/2011 | Singh | |
| 2011/0090097 A1 | 4/2011 | Beshke | |
| 2011/0109567 A1 | 5/2011 | Kim | |
| 2011/0144586 A1 | 6/2011 | Michaud | |
| 2011/0170690 A1 | 7/2011 | Shpantzer | |
| 2011/0180336 A1 | 7/2011 | Kurata | |
| 2011/0185313 A1 | 7/2011 | Harpaz | |
| 2011/0185319 A1 | 7/2011 | Carapelli | |
| 2011/0191591 A1 | 8/2011 | Cheng | |
| 2011/0191856 A1 | 8/2011 | Keen | |
| 2011/0199387 A1 | 8/2011 | Newton | |
| 2011/0204140 A1 | 8/2011 | Hart | |
| 2011/0246369 A1 | 10/2011 | De Oliveira | |
| 2011/0281630 A1 | 11/2011 | Omar | |
| 2011/0310019 A1 | 12/2011 | Wilson | |
| 2011/0313871 A1 | 12/2011 | Greenwood | |
| 2011/0321138 A1 | 12/2011 | Kruger | |
| 2012/0042365 A1 | 2/2012 | Shoval | |
| 2012/0047564 A1 | 2/2012 | Liu | |
| 2012/0079273 A1 | 3/2012 | Bacchiaz | |
| 2012/0095867 A1 | 4/2012 | McKelvey | |
| 2012/0096277 A1 | 4/2012 | Perez Soria | |
| 2012/0098750 A1 | 4/2012 | Allen | |
| 2012/0132705 A1 | 5/2012 | Goluke et al. | |
| 2012/0158672 A1 | 6/2012 | Oltean | |
| 2012/0159160 A1 | 6/2012 | Poisner | |
| 2012/0159582 A1 | 6/2012 | Griffin | |
| 2012/0159583 A1 | 6/2012 | Griffin | |
| 2012/0159592 A1 | 6/2012 | Griffin | |
| 2012/0159593 A1 | 6/2012 | Griffin | |
| 2012/0159594 A1 | 6/2012 | Griffin | |
| 2012/0159609 A1 | 6/2012 | Griffin | |
| 2012/0159613 A1 | 6/2012 | Griffin | |
| 2012/0159614 A1 | 6/2012 | Griffin | |
| 2012/0159616 A1 | 6/2012 | Griffin | |
| 2012/0162086 A1 | 6/2012 | Rhee | |
| 2012/0185398 A1 | 7/2012 | Weis | |
| 2012/0222100 A1 | 8/2012 | Fisk | |
| 2012/0222102 A1 | 8/2012 | Hirose | |
| 2012/0235912 A1 | 9/2012 | Laubach | |
| 2012/0249295 A1 | 10/2012 | Yeung | |
| 2012/0253971 A1 | 10/2012 | Bansal | |
| 2012/0256723 A1 | 10/2012 | Grover | |
| 2012/0260326 A1 | 10/2012 | Steigmann | |
| 2012/0291120 A1 | 11/2012 | Griffin | |
| 2012/0299831 A1* | 11/2012 | Lioy | G06F 21/36 345/168 |
| 2012/0305648 A1 | 12/2012 | Sondhi | |
| 2012/0311723 A1 | 12/2012 | Britt, Jr. | |
| 2012/0313858 A1 | 12/2012 | Park | |
| 2012/0323788 A1 | 12/2012 | Keresman, III | |
| 2013/0018800 A1 | 1/2013 | Devaraju | |
| 2013/0019320 A1 | 1/2013 | Ericsson | |
| 2013/0020389 A1 | 1/2013 | Barnett | |
| 2013/0021233 A1 | 1/2013 | Umminger | |
| 2013/0023240 A1 | 1/2013 | Weiner | |
| 2013/0026513 A1 | 1/2013 | Aurongzeb | |
| 2013/0029824 A1 | 1/2013 | De Koning | |
| 2013/0042318 A1 | 2/2013 | Thatha | |
| 2013/0047237 A1 | 2/2013 | Ahn | |
| 2013/0050088 A1 | 2/2013 | Smith | |
| 2013/0060739 A1 | 3/2013 | Kalach | |
| 2013/0078951 A1 | 3/2013 | Mun | |
| 2013/0086382 A1 | 4/2013 | Barnett | |
| 2013/0091583 A1 | 4/2013 | Karroumi | |
| 2013/0106690 A1 | 5/2013 | Lim | |
| 2013/0117573 A1 | 5/2013 | Harbige | |
| 2013/0148044 A1 | 6/2013 | Ohyama | |
| 2013/0154937 A1 | 6/2013 | Park | |
| 2013/0154981 A1 | 6/2013 | Park | |
| 2013/0159196 A1 | 6/2013 | Dizoglio | |
| 2013/0198459 A1 | 8/2013 | Joshi | |
| 2013/0207902 A1 | 8/2013 | Showering | |
| 2013/0232549 A1 | 9/2013 | Hawkes | |
| 2013/0265136 A1 | 10/2013 | Wadia | |
| 2013/0298246 A1 | 11/2013 | Cragun | |
| 2013/0301830 A1 | 11/2013 | Bar-El | |
| 2014/0002558 A1 | 1/2014 | Ramesh | |
| 2014/0013252 A1 | 1/2014 | Ehrler | |
| 2014/0025580 A1 | 1/2014 | Bacastow | |
| 2014/0096201 A1 | 4/2014 | Gupta | |
| 2014/0153489 A1 | 6/2014 | Perras | |
| 2014/0162598 A1 | 6/2014 | Villa-Real | |
| 2014/0168083 A1 | 6/2014 | Ellard | |
| 2014/0173492 A1 | 6/2014 | Yoon | |
| 2014/0195429 A1 | 7/2014 | Paulsen | |
| 2014/0201831 A1 | 7/2014 | Yi | |
| 2014/0281995 A1 | 9/2014 | Kim | |
| 2014/0283022 A1 | 9/2014 | Beloncik | |
| 2014/0310531 A1 | 10/2014 | Kundu | |
| 2014/0324698 A1 | 10/2014 | Dolcino | |
| 2014/0324708 A1 | 10/2014 | McCauley | |
| 2014/0325677 A1* | 10/2014 | Kotla | G06F 21/84 726/28 |
| 2014/0325678 A1* | 10/2014 | Kotla | G06F 21/62 726/28 |
| 2014/0341109 A1 | 11/2014 | Cartmell | |
| 2014/0365867 A1 | 12/2014 | Kawasaki | |
| 2015/0095241 A1 | 4/2015 | Edwards | |
| 2015/0116225 A1 | 4/2015 | Luo | |
| 2015/0135206 A1 | 5/2015 | Reisman | |
| 2015/0154414 A1* | 6/2015 | Pike | G06F 21/36 726/30 |
| 2015/0154598 A1 | 6/2015 | Forte | |
| 2015/0261968 A1 | 9/2015 | Polyachenko | |
| 2015/0332038 A1 | 11/2015 | Ramsden | |
| 2015/0347774 A1 | 12/2015 | Krstic | |
| 2015/0350163 A1 | 12/2015 | Brander | |
| 2015/0371213 A1 | 12/2015 | Pike | |
| 2015/0379288 A1 | 12/2015 | Kubik | |
| 2016/0005150 A1 | 1/2016 | Ghassabian | |

(56) References Cited

U.S. PATENT DOCUMENTS

| | | | |
|---|---|---|---|
| 2016/0006718 A1 | 1/2016 | Huxham | |
| 2016/0034718 A1 | 2/2016 | Mizrachi | |
| 2016/0042190 A1 | 2/2016 | Adderly | |
| 2016/0063230 A1 | 3/2016 | Alten | |
| 2016/0065546 A1 | 3/2016 | Krishna | |
| 2016/0125193 A1 | 5/2016 | Dai Zovi | |
| 2016/0154980 A1 | 6/2016 | Neumann | |
| 2016/0170497 A1 | 6/2016 | Gardner | |
| 2016/0224771 A1 | 8/2016 | Pike | |
| 2016/0246955 A1 | 8/2016 | Jiang | |
| 2016/0253508 A1 | 9/2016 | Song | |
| 2016/0283013 A1 | 9/2016 | Engstrom | |
| 2016/0307001 A1 | 10/2016 | Dow | |
| 2016/0314293 A1 | 10/2016 | Pike | |
| 2016/0314468 A1 | 10/2016 | Smith et al. | |
| 2016/0320965 A1 | 11/2016 | Chung | |
| 2016/0337334 A1* | 11/2016 | Murr | H04L 63/0853 |
| 2016/0337857 A1 | 11/2016 | Carron | |
| 2017/0006140 A1 | 1/2017 | Park | |
| 2017/0052939 A1* | 2/2017 | Seol | G06F 3/0482 |
| 2017/0061138 A1 | 3/2017 | Lambert | |
| 2017/0061408 A1 | 3/2017 | Choi | |
| 2017/0090750 A1* | 3/2017 | Forte | G06Q 20/1085 |
| 2017/0103395 A1 | 4/2017 | Everhart | |
| 2017/0140354 A1 | 5/2017 | Jenkins | |
| 2017/0192670 A1 | 7/2017 | Raman | |
| 2017/0228525 A1* | 8/2017 | Wajs | H04L 9/3226 |
| 2017/0235926 A1 | 8/2017 | Fyke | |
| 2017/0270764 A1 | 9/2017 | Riedel | |
| 2018/0032831 A1 | 2/2018 | Kim | |
| 2018/0150623 A1 | 5/2018 | Pike | |
| 2018/0150628 A1 | 5/2018 | Pike | |
| 2018/0150629 A1 | 5/2018 | Pike | |
| 2018/0150630 A1 | 5/2018 | Pike | |
| 2018/0374392 A1* | 12/2018 | Ollivier | G07F 7/1041 |
| 2020/0005273 A1 | 1/2020 | Pike | |
| 2020/0201960 A1 | 6/2020 | Pike | |
| 2020/0210557 A1 | 7/2020 | Pike | |
| 2020/0226235 A1 | 7/2020 | Pike | |

FOREIGN PATENT DOCUMENTS

| | | |
|---|---|---|
| CN | 101126967 A | 2/2008 |
| CN | 201035502 Y | 3/2008 |
| CN | 201111222 Y | 9/2008 |
| CN | 202150070 U | 2/2012 |
| CN | 105956857 A | 9/2016 |
| CN | 106022172 A | 10/2016 |
| DE | 4129202 A1 | 3/1993 |
| DE | 19803339 A1 | 8/1999 |
| DE | 10100188 | 7/2002 |
| DE | 10306352 A1 | 9/2004 |
| DE | 102008050609 A1 | 10/2009 |
| DE | 102008056605 A1 | 5/2010 |
| DE | 102009022845 A1 | 9/2010 |
| DE | 102009023925 A1 | 12/2010 |
| DE | 102010022368 A1 | 12/2011 |
| EP | 0432409 A1 | 6/1991 |
| EP | 0662665 A2 | 7/1995 |
| EP | 0870222 A2 | 10/1998 |
| EP | 1161060 A1 | 12/2001 |
| EP | 1599786 A2 | 11/2005 |
| EP | 1600847 A1 | 11/2005 |
| EP | 1615181 A1 | 1/2006 |
| EP | 1742450 | 1/2007 |
| EP | 1840778 A1 | 10/2007 |
| EP | 2141647 A1 | 1/2010 |
| EP | 2365469 | 9/2011 |
| EP | 2400426 A1 | 12/2011 |
| EP | 2458491 A2 | 5/2012 |
| EP | 2466512 A1 | 6/2012 |
| EP | 2466513 A1 | 6/2012 |
| EP | 2466514 A1 | 6/2012 |
| EP | 2466515 A1 | 6/2012 |
| EP | 2466516 A1 | 6/2012 |
| EP | 2466517 A1 | 6/2012 |
| EP | 2466518 A1 | 6/2012 |
| EP | 2466519 A1 | 6/2012 |
| EP | 2466520 A1 | 6/2012 |
| EP | 2466521 A1 | 6/2012 |
| EP | 2487620 A1 | 8/2012 |
| EP | 2512090 A1 | 10/2012 |
| EP | 2523137 A1 | 11/2012 |
| EP | 2775421 | 9/2014 |
| EP | 3163926 A1 | 5/2017 |
| EP | 3176722 A1 | 6/2017 |
| EP | 3355512 A1 | 8/2018 |
| FR | 2622322 | 4/1989 |
| FR | 2810067 | 12/2001 |
| FR | 2812423 A1 | 2/2002 |
| FR | 2819067 | 7/2002 |
| FR | 2923034 A1 | 5/2009 |
| FR | 2961330 A1 | 12/2011 |
| FR | 2969342 A1 | 6/2012 |
| GB | 2387702 A | 10/2003 |
| GB | 2388229 A | 11/2003 |
| GB | 2389693 A | 12/2003 |
| GB | 2402649 A | 12/2004 |
| GB | 2416058 A | 1/2006 |
| GB | 2427059 A | 12/2006 |
| GB | 2438886 A | 12/2007 |
| GB | 2454459 A | 5/2009 |
| GB | 2457733 A | 8/2009 |
| GB | 2520207 A | 5/2015 |
| GB | 2542512 | 3/2017 |
| GB | 2556474 | 5/2018 |
| JP | 1995271884 | 10/1995 |
| JP | 2000099801 A | 4/2000 |
| JP | 2000165378 | 6/2000 |
| JP | 2003346098 A | 12/2003 |
| JP | 2004102460 | 4/2004 |
| JP | 2005107678 | 4/2005 |
| JP | 2006243938 A | 9/2006 |
| JP | 2008506198 | 2/2008 |
| JP | 2008204409 A | 9/2008 |
| JP | 2008537210 | 9/2008 |
| JP | 2009199581 A | 9/2009 |
| JP | 2009237774 A | 10/2009 |
| JP | 2010126913 A | 6/2010 |
| JP | 2010533925 | 10/2010 |
| JP | 2012138011 A | 7/2012 |
| JP | 2012194648 A | 10/2012 |
| KR | 20090130455 A | 12/2009 |
| KR | 101520803 | 5/2015 |
| KR | 20180056116 A | 5/2018 |
| WO | 9311551 | 6/1993 |
| WO | 9705578 | 2/1997 |
| WO | 0025474 A1 | 5/2000 |
| WO | 0146922 | 6/2001 |
| WO | 0146922 A1 | 6/2001 |
| WO | 02071177 A2 | 9/2002 |
| WO | 03058947 A2 | 7/2003 |
| WO | 2005104428 A2 | 11/2005 |
| WO | 2006010058 | 1/2006 |
| WO | 2006064241 A2 | 6/2006 |
| WO | 2006095203 | 9/2006 |
| WO | 2007056746 | 5/2007 |
| WO | 2007143740 A2 | 12/2007 |
| WO | 2009000223 A2 | 12/2008 |
| WO | 2009009788 A1 | 1/2009 |
| WO | 2009012326 | 1/2009 |
| WO | 2009130985 | 10/2009 |
| WO | 2010131218 A | 11/2010 |
| WO | 2010134808 | 11/2010 |
| WO | 2011093998 A1 | 8/2011 |
| WO | 2011155915 A1 | 12/2011 |
| WO | 12009334 | 1/2012 |
| WO | 2012004395 A1 | 1/2012 |
| WO | 2012077098 A1 | 6/2012 |
| WO | 2012131420 A1 | 10/2012 |
| WO | 2012146587 A1 | 11/2012 |
| WO | 2013013192 | 1/2013 |
| WO | 2013021233 | 2/2013 |
| WO | 2013148044 | 10/2013 |

(56) References Cited

FOREIGN PATENT DOCUMENTS

| WO | 2014013252 A2 | 1/2014 |
|---|---|---|
| WO | 2014111689 A1 | 7/2014 |
| WO | 2014132193 | 9/2014 |
| WO | 2015055973 | 4/2015 |
| WO | 2015063474 | 5/2015 |
| WO | 2016046458 A1 | 3/2016 |
| WO | 2016048236 | 3/2016 |
| WO | 2016189325 A1 | 12/2016 |
| WO | 2017065576 A1 | 4/2017 |
| WO | 2017190561 A1 | 11/2017 |

OTHER PUBLICATIONS

Salman, Muhammad et al. A Graphical PIN Entry System with Shoulder Surfing Resistance. 2019 IEEE 4th International Conference on Signal and Image Processing (ICSIP). https://ieeexplore.ieee.org/stamp/stamp.jsp?tp=&arnumber=8868388 (Year: 2019).*
"Hackers Could Guess Your Phone PIN Using Its Sensor Data", Nanyang Technological University, (2017), Science Daily online at www.sciencedaily.com/releases/2017/12/171226134614.htm.
PCT Search Report and Written Opinion dated Feb. 5, 2021 of Application No. PCT/IB2020/060521.
Anonymous, "Fujitsu Develops World's First Authentication Technology to Extract and Match 2,048-bit Feature Codes from Palm Vein Images", Fujitsu Global, Kawasaki, Japan, (Aug. 5, 2013), URL: http://www.fujitsu.com/global/about/resources/news/press-releases/2013/0805-01.html, (Aug. 1, 2016), XP055292505, 4 pages.
Australian Examination Report dated Mar. 26, 2021 from Australian Application No. 2016269265.
Australian Office Action dated Jan. 18, 2021 of application No. 2016269268.
Chinese Office Action dated Dec. 10, 2021 of application No. 201910409131.8.
Chinese Office Action dated Dec. 3, 2020 of Application No. 201680039203.9.
Chinese Re-Exam Report dated Dec. 15, 2021 of application No. 201680039224.0.
Ciphercard: A Token-Based Approach Against Camera-Based Shoulder Surfing Attacks on Common Touchscreen Devices Authors: Teddy Seyed; Xing-Dong Yang; Anthony Tang; Saul Greenberg; Jiawei Gubin; Zhuxiang Cao.
Decision to Grant for related GB2520207 dated Dec. 8, 2015. 2 pages.
Examination Report of Application No. GB1619853.3 dated Mar. 8, 2017. 3 pages.
Examination Report of Indian Application No. 2301/KOLNP/2015 dated Oct. 18, 2019. 5 pages.
EyeDecrypt—Private Interactions in plain Sight, Forte et al., Proc. 9th Conference on Security and Cryptography for Networks (SCN 2014).
GlobalPlatform Device Technology Trusted User Interface API, Version 1.0, Jun. 2013, Document Reference: GPD_SPE_020.
https://patentscope.wipo.int/search/en/detail.jsf?docId=WO2011116570 &tab=PCTBIBLIO&maxRec=1000 (Year: 2010), 4 pages.
https://patentscope.wipo.int/search/en/detail.jsf?docId=WO2016188127 &tab=PCTBIBLIO&maxRec=1000 (Year: 2015), 6 pages.
Indian Office Action dated Feb. 1, 2021 of application No. 20173704209.
Indian Office Action dated Jan. 21, 2021 of application No. 201737042169.
International Search Report and Written Opinion of International Application No. PCT/GB2016/051548 dated Aug. 8, 2016, 10 pages.
International Search Report and Written Opinion of International Application No. PCT/GB2016/051549 dated Aug. 10, 2016, 11 pages.
International Search Report and Written Opinion of International Application No. PCT/GB2016/051550 dated Aug. 8, 2016, 10 pages.
International Search Report and Written Opinion of International Application No. PCT/GB2016/051553 dated Aug. 4, 2016, 9 pages.
International Search Report in related PCT Application No. PCT/GB2013/051913 mailed Feb. 6, 2014. 6 pages.
Japanese Office Action dated Mar. 29, 2022 of application No. 2021-074661.
Japanese Office Action dated Sep. 8, 2020 of application No. 2017-561754.
PCI Mobile Payment Acceptance Security Guidelines for Developers, Version 1.0, Emerging Technologies, PCI Security Standards Council, Sep. 2012.
PCI Mobile Payment Acceptance Security Guidelines for Merchants as End-Users, Version 1.0, Emerging Technologies, PCI Security Standards Council, Feb. 2013.
Roos, "Automatically Downloading My ING Direct Transactions—Chris Roos", Jun. 23, 2007, XP055085833. 7 pages.
Scramblepad, Scrambleprox, Scramblesmart, Scramblesmartprox Author: Hirsch Electronics Date: Jul. 27, 2013.
Search and Examination Report of Application No. GB1906165.4 dated Aug. 23, 2019, 5 pages.
Search Report cited in Office Action dated Nov. 26, 2019 of Russian Application No. 2017141194/08, 2 pages.
Search Report dated Jul. 22, 2020 of GB application No. GB1916441.7, 2 pages.
Search Report in related GB Application No. GB1212878.1 mailed Dec. 3, 2012. 4 pages.
Search Report issued by United Kingdom Intellectual Property Office dated Oct. 6, 2017 for Application No. GB1321505.8, 3 pages.
Secure Mobile Payment on NFC-Enabled Mobile Phones Formally Analysed Using CasperFDR, S. Abughazalah et al, 2014 IEEE 13th International Conference on Trust, Security and Privacy in Computing and Communications, pp. 422-431.
Thales e-Security mPOS Secure Mobile Card Acceptance White Paper, Nov. 2013.
The Usability of Picture Passwords, Fraser, Jul. 23, 2014, 11 pages.
Touch Screen Remote Arming Station (RAS) Author: Tecom Date: Mar. 18, 2015.
Translation of Office Action dated Nov. 26, 2019 of Russian Application No. 2017141194/08, 6 pages.
Using Biometrics to Generate Public and Private Keys, Satrugna Pakala, (May 31, 2006) Retrieved from internet; URL: http://www.sci.tamucc.edu/~cams/GraduateProjects/view.php?view=266, 50 pages.
Written Opinion of the Intl Searching Authority in related PCT Application No. PCT/GB2013/051913, 201 , Jan. 20, 2015, 11 pages.
EP Office Action dated Feb. 23, 2024 of Application No. 20 811 100.5.

* cited by examiner

SYSTEMS AND METHODS FOR SECURE DATA INPUT AND AUTHENTICATION

CROSS-REFERENCE TO RELATED APPLICATIONS

This application is the National Stage of International Patent Application No. PCT/IB2020/060521 filed on Nov. 9, 2020, which claims priority from British Patent Application No. GB 1916441.7 filed on Nov. 12, 2019, both of which are hereby incorporated by reference herein in their entireties.

TECHNICAL FIELD

This invention relates generally to security techniques and secure input of sensitive data into an electronic device, and advantageously for secure systems and methods for validation or authentication of a user before allowing (or prohibiting) access to a controlled physical or virtual/electronic/digital resource, and/or allowing an operation to be performed. The invention is particularly suited, but not limited to, use in respect of authentication on a mobile computing device such as a smart phone, tablet or laptop computer. It also lends itself for use in respect of securing financially oriented accounts and resources, and entry of a user's PIN and/or password, although the invention is not limited in these respects and can be used for other applications and for the entry of other types of input.

BACKGROUND

There are many situations where sensitive and confidential data needs to be put into an electronic device. Such data needs to be protected from unauthorised viewing or access during the input process itself but also following entry into the device. A common example of such a situation is entry of a secret identifier, such as a PIN or password, which is to be used during an authentication process.

Authentication techniques are used in a variety of situations where an individual's identity and/or authorisation needs to be verified prior to being allowed to perform an act or gain access to some controlled or managed resource such as a device, building, a vehicle, a computer system, a financial or other type of digitally-implemented account, a service, a computer network or device etc.

One common approach to authentication is to record some pre-selected identifier comprising a code or combination of symbols which is then maintained in secrecy in a secure location and available only to authorised parties. For the sake of convenience, the identifier may be referred to in this document as a Personal Identification Code (PIC) although it is important to note that the identifier may comprise other types and combinations of symbols and not just numeric digits. The term 'PIC' as used herein should not be construed as limiting the invention with respect to the type or format of the user's identifier.

After the identifier has been selected and assigned to an authorised individual (or group of individuals), the user is required to supply the correct identifier each time he requests permission to perform the controlled act or gain access to the resource or service. The user's inputted identifier is compared with the pre-stored version. If the input matches the stored identifier then the user's identity is deemed to have been verified and access is granted. Alternatively, if the input does not match the pre-stored version then access is denied.

The use of PINS has become commonplace, especially in relation to banking and financial applications. Customers have become accustomed to, and trusting of, the use of PIN-based verification. Financial institutions also favour PIN-based authentication as it provides a more secure form of verification than, for example, a signature. Further still, when a transaction requires authentication via a PIN the liability for any fraud resulting from that transaction is deemed to lie with the user who has supplied the PIN. This is in contrast to 'card not present' transactions such as on-line transactions where the liability remains with the issuing financial institution.

Another authentication approach involves using a device to capture biometric data relating to the unique physical or behavioural attributes of the individual such as iris pattern, palm geometry or fingerprint. An advantage of biometric authentication is that users do not need to remember passwords or codes, and the required information is always carried inherently by the individual wherever they go so no additional hardware such as tokens need to be carried. Therefore, biometric authentication offers a convenient and simple authentication solution which is attractive to end users.

However, despite the attractions of biometric authentication, it has yet to be widely adopted within certain industries such as the banking industry. One reason for this is that the infrastructure of the banking industry is geared towards verification using a 4 digit PIN.

This includes payment terminals, ATMs, switches, and the apparatus at both the acquiring and issuing banks, which would all need to be replaced or adapted at significant cost in order to move from PIN-based to biometric authentication. Other concerns arise in relation to the security of biometric data which may be captured from non-secure sources. For example, fingerprints can be 'lifted' from public places, voices can be recorded. In addition, while it is easy to change a stored PIN or identifier it is not possible for an individual change biometric data such as fingerprint, iris pattern etc.

These concerns can be reduced by the use of two or three-factor authentication wherein at least two of the following are used during authentication:
  What you know (eg PIN, password)
  Who you are (eg fingerprint, retina pattern, face or voice patterns)
  What you have (eg smart card, security token, mobile device)

Therefore, a system which requires a user to authenticate with both a PIN and biometric data on a device owned or operated by the user would provide enhanced security.

With respect to mobile technology, more and more people are using handheld computing devices such as smart phones and tablet computers etc for identity-sensitive operations such as banking. However, such devices are known to be insecure and passwords, PINS and other valuable authentication data can be compromised by third parties. Therefore, there is a significant challenge in providing an authentication solution which is secure even when used on an off-the-shelf computing/mobile device.

One such solution has been disclosed in WO 2014/013252 which teaches the concept of sending an image of a scrambled keypad from a server to a user's device (PC, mobile phone, tablet etc). An operable, functional keypad is generated on the device and the image is displayed in a defined keypad display zone on the screen in the same position as the keypad. The image is superimposed over the keypad such that it is hidden from view yet still functional in the background. The positions of the underlying keypad keys do not correspond to the positions of the same 'keys' depicted in the image. To the user, only the image of the scrambled keypad is visible and thus when the user touches or clicks on part of the image to select an input, the operable keypad interprets this input differently and an encoded version of the user's input is received into memory on the device. Thus, as the user's real identifier (eg PIN) is never entered into the keyboard buffer or elsewhere on the device it cannot be fraudulently obtained from it. The encoded identifier is then transmitted to a remote server which knows the order of keys depicted in the keypad image, and can thus decode the user's input. In effect, a mapping is created between the keypad configurations, and this mapping is used to both encode and decode the identifier. This solution provides significant advantages over other authentication techniques, because it does not require the user to remember a different identifier, does not require the use of special or additional hardware, and avoids entry of the user's real identifier into an insecure device.

In the WO 2014/013252 arrangement, however, the operable keypad and pin pad display zone remains static, in that the pin pad image is always shown in the same position on the screen during PIN entry and for each transaction/authentication session. The position of the underlying operable keypad remains fixed as well so as to provide the mapping between the operable keys and the image's "keys" which enables the encoding of the user's PIN.

However, in recent years security concerns have arisen relating to sensors such has accelerometers, gyroscopes, magnetometers, proximity sensors, barometers, and ambient light sensors. Such sensors are commonly provided in mobile devices such as smart phones. Apps installed on the device can access these sensors without authorization from the device operator. It has been shown that sensors can be used to determine which key a user has pressed based on how the device is orientated or tilted, and how much light is blocked by the user's thumb or finger. This problem is discussed, for example, in Nanyang Technological University, (2017, December 26), "Hackers could guess your phone PIN using its sensor data". *ScienceDaily*, online at www-.sciencedaily.com/releases/2017/12/171226134614.htm Other potential exploits that may be utilised by malicious parties also rely on being able to observe or monitor use of a keypad in a fixed and/or predictable location relative to the screen.

Thus, it is desirable to provide an authentication solution which avoids or at least reduces the security risks associated with prior art arrangements. An improved solution has now been devised.

SUMMARY

Embodiments of the present invention are provided as defined in the appended claims.

The invention provides improved solutions for secure data entry into an electronic device. Additionally or alternatively, it may be described as a method/system for verifying/authenticating the identity of a user. This may be performed in order to control access to a secured or controlled resource. The controlled resource may be a physical resource eg vehicle or building, or a digital/electronic resource such as a computer network, a program, account associated with a user, or a wallet etc.

The invention provides improved security by preventing or at least mitigating known exploits that may otherwise be used to gain knowledge of a user's sensitive data or verification element such as a PIN, password or other identifier used for verification purposes. Thus, the invention provides an improved security solution and also a more secure electronic verification device. The device is more versatile because it can be used for a wider range of applications that may not have been previously possible given security concerns.

In accordance with one possible embodiment, the invention may comprise the step of: selecting a keypad zone (area) within an area of a display zone of a touch screen. The keypad zone may be the substantially the same size or smaller than the display zone.

The display zone and/or keypad zone may comprise a plurality of hotspots (areas) that implement or function as operable keys. The display zone and/or keypad zone may provide or comprise an operable keypad. The operable keypad may comprise a plurality of operable keypad keys, each comprising and/or corresponding to a hotspot. Thus, the operable keypad may comprise keys, each key corresponding to a respective hotspot in a subset of the plurality of hotspots. Each operable key may be assigned or associated with at least one value, character, picture, symbol or other indicia. The terms "symbol" and "indicia" may be used interchangeably herein. The indicia may be selected from a range of possible or allowable indicia. Thus, an operable key may be, and/or may correspond to, a hotspot provided on a touch screen and associated with at least one indicia that will be entered into the device when a touch is located at or within the hotspot. A quantity of specified or selected hotspots may form an operable keypad. The indicia associated with a given hotspot may mutable. In other words, it may be possible to change the indicia that is associated with a given hotspot. This may be achieved using a portion of code that translates the user's selection into a data item (indicia) for entry into the device, or via the use of an object such as a virtual keypad.

In a preferred embodiment, the invention also comprises the step of providing an image of a keypad at substantially the same location as the keypad zone and/or covering the same or substantially the same area as the keypad zone. The keypad image may cover all or some of the operable key(s) within the keypad zone and the keypad image may function as a visible mask or cover superimposed over the operable keys of the keypad zone.

Preferably, the indicia of the keys shown in the image do not match the position of the indicia of the corresponding operable key(s). This may enable a mapping (i.e. correspondence) to be generated between the underlying operable keys and those depicted in the image. In a preferred embodiment, this enables an encoded version of the user's input to be received by the electronic device. Preferably, a new keypad zone is selected at a different location within the display zone when the authentication process is subsequently repeated.

According to at least one embodiment, the disclosure may comprise a method of: selecting a keypad zone within an area of a display zone of a screen of an electronic device, wherein the keypad zone comprises a plurality of operable keys. Selection of the keypad zone may comprise designation or selection of a subset of hotspots provided within the display zone. The subset may comprise one or more hotspots.

Additionally or alternatively, the method may comprise the step of providing an operable keypad within a keypad zone of a display zone of a screen associated with an electronic device, wherein the operable keypad comprises a plurality of operable keys, each key associated with at least one symbol.

The electronic device may be a computing device. It may be portable, handheld and/or mobile. It may be, for example, a smart phone, a tablet, a laptop etc. It may be a smart phone configured for installation and/or execution of a version of the Android operating system. It may comprise an accelerometer. The screen may be a touch screen. The touch screen may be provided in association with software and hardware for sensing touches made by a user. The electronic device may comprise a secure environment or security hardened portion such as a TEE, TUI, HSM, secure element etc. One or more steps associated with the disclosure may be performed within the secure environment.

Additionally, or alternatively, the method may comprise the step of providing a keypad image within the keypad zone such that a mapping is generated between the plurality of operable keys and keys depicted in the keypad image. The keypad image may depict i.e. illustrate or represent a plurality of keys. The keypad image may be arranged to and/or dimensioned so as to correspond substantially with the size, shape, layout, appearance and/or format of the keypad zone.

Additionally, or alternatively, the method may comprise the step of selecting a new i.e. different keypad zone within a different area of the display zone and providing the same or a new keypad image within the new keypad zone. The relocation of the keypad image may correspond with the relocation of the operable keypad relative to the display zone of the screen. Thus, the keypad image may track or move in correspondence with the operable keypad. This provides the advantage that the operable keypad remains hidden from view and a mapping continues to be provided between the keys depicted in the image and the keys of the operable keypad. Thus, security is not compromised.

Selection of a new/different keypad zone may comprise designation or selection of a different subset of hotspots within the display zone.

Preferably, the keypad zone is smaller than the display zone and/or forms a portion of the display zone. The display zone may extend to at least one edge of the screen.

In one or more embodiments, the entire display zone may comprise a plurality of operable keys, each associated with at least one symbol or indicia and which, when operated by a user, causes the symbol(s) or indicia to be entered into the electronic device.

Preferably, the plurality of operable keys in the keypad zone is a subset of a plurality of operable keys/hotspots provided within the display zone. Preferably, the mapping enables an encoded version of a user's input to be received by the electronic device.

Preferably, the keypad image forms part of a larger image or is presented on the screen over a larger image. The larger image may provide a border or margin around the keypad image. In another embodiment, the keypad image may be provided over a larger image so that the keypad image is visible but masks at least a portion of the larger image. The unmasked portion of the larger image may provide a visible border or margin around or adjacent to the keypad image.

The keypad image may depict a scrambled or a non-scrambled keypad. "Scrambled" may mean that the keys are in a different order relative to a default or reference keypad configuration and/or not in an expected or contiguous order. The keypad image may be displayed such that at least some of the operable keys are masked, or partially/wholly hidden from view by at least a portion of the keypad image. Preferably, operable keys which are provided outside the keypad zone (ie keys which are not located within the keypad zone) are not visible to an observer eg the user.

The method may comprise the step of constructing an encoded identifier from a plurality of encoded inputs received from the user, into the device, via operation of an operable key via the keypad image. The method may comprise the step of using the mapping to decode the user's input.

The invention also provides a system, comprising:
a processor; and
memory including executable instructions that, as a result of execution by the processor, causes the system to perform any embodiment of the computer-implemented method described herein.

The system may comprise a secure environment, a trusted execution environment (TEE), a Trusted User Interface (TUI), a HSM or secure area associated with the processor or an alternative or additional processor.

The invention also provides a non-transitory computer-readable storage medium having stored thereon executable instructions that, as a result of being executed by a processor of a computer system, cause the computer system to at least perform an embodiment of the computer-implemented method described herein.

Terminology

In this document, the terms "authentication", "verification" and "validation" may be used interchangeably. The term "user" may be used to refer to a human user or individual, or group thereof, or an electronic device/system. The terms "keypad" and "pinpad" or "PIN pad" may be used interchangeably. These terms are also intended to include and cover a "keyboard" having alphanumeric and other symbols/keys. A "pinpad" may comprise or be a "keypad" and vice versa.

The term "PIC" (Personal Identification Code) is used herein to refer to and include any type of identifier which can be used during an authentication process to identify a user. This includes a PIN (Personal Identification Number), password, memorable information etc. For ease of reference only, the term "PIN" may be used interchangeably herein with PIC as the term PIN is more widely recognised. The PIC is not limited in respect of the type, number or format of characters which it comprises. Examples shown herein depict a numeric PIC but other symbols eg letters, punctuation marks or pictures etc., can be used instead of, or in combination with, numeric digits.

The terms "hot spot" and "operable key" may be used interchangeably herein.

These and other aspects of the present invention will be apparent from and elucidated with reference to, the illustrative embodiment described herein. An embodiment of the present invention will now be described, by way of example only, and with reference to the accompanying drawings.

BRIEF DESCRIPTION OF THE ACCOMPANYING DRAWINGS

Figures 2A, 2B:
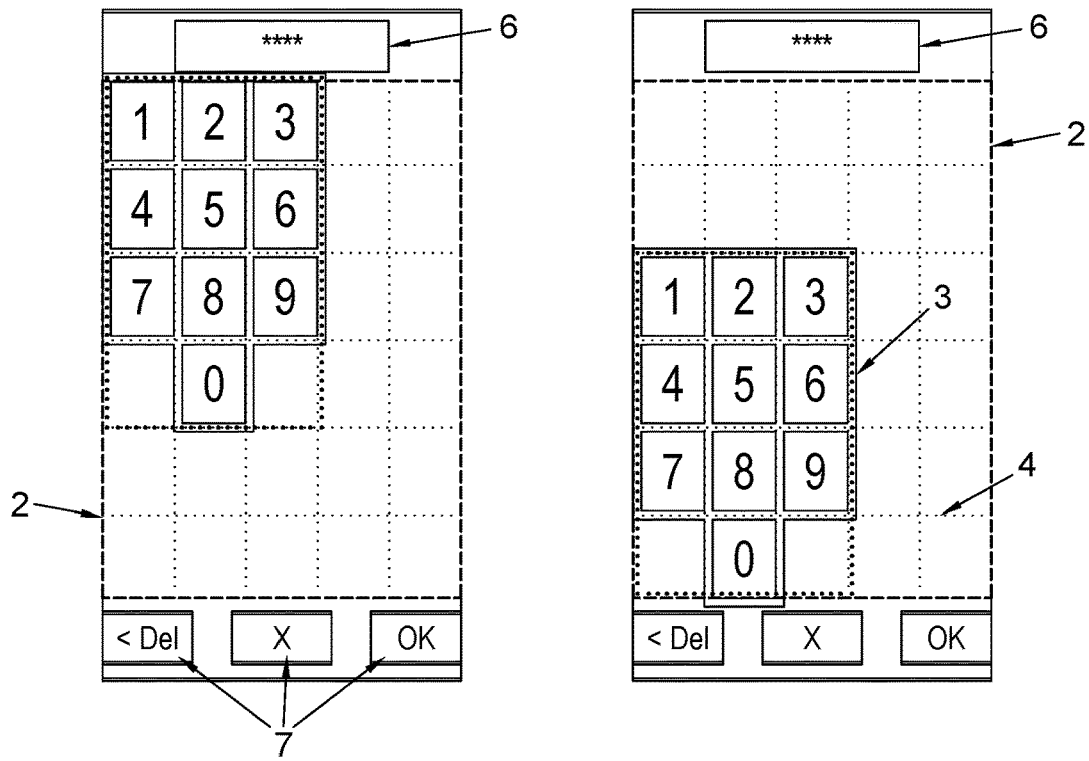
FIGS. 2a, 2b, 3a and 3b show the embodiment of FIG. 1 in use but with the keypad presented in different locations on the screen of the electronic device.
Figure 3A:
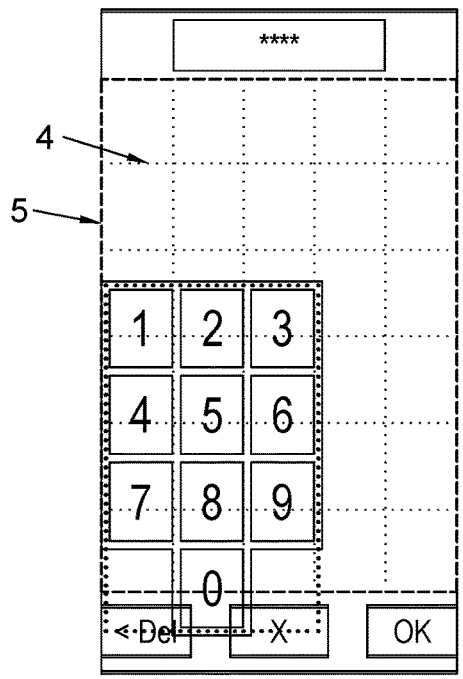
Figure 3B:
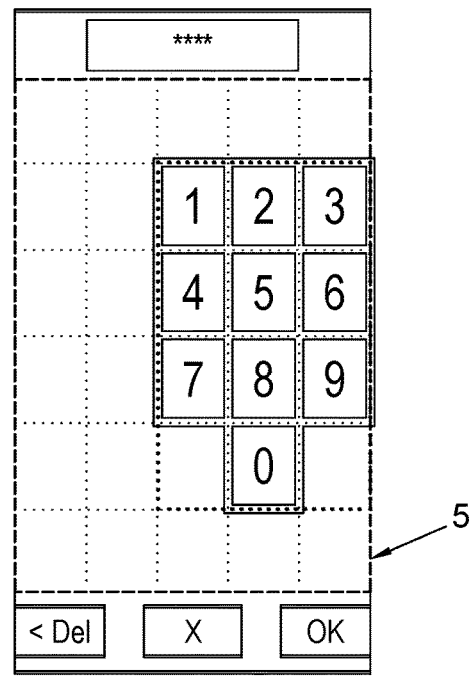
Figure 4A:
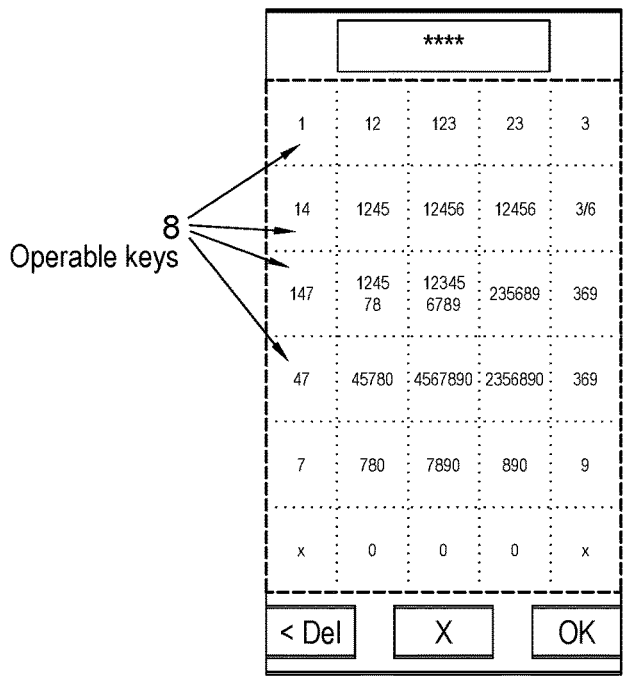
FIG. 4a shows the screen of the electronic device of FIGS. 1 through 3b divided up into touch-enabled hot spots, and the possible entry values (pin pad symbols) which are possible for each hot spot depending upon where the non-scrambled keypad shown on the right is presented on the screen.
Figure 4B:
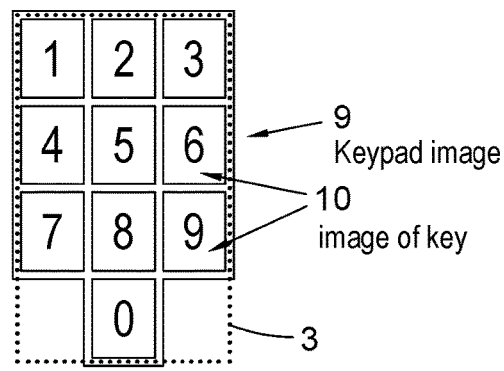

FIG. 4b shows an illustrative image of a keypad comprising a plurality of depicted keys; in use, the keypad image is provided over an area of the display zone as shown in FIGS. 1 through 3b so that the keys depicted in the keypad image so that they cover a plurality of corresponding hotspots; each key image 10 is displayed in the same location as a corresponding hotspot so that when the key image 10 is touched by the user the user the user's selection is detected at the hotspot and a data item is entered into the device. The keypad image may form or provide part of a larger image such that other hotspots are also covered.

Figure 5:
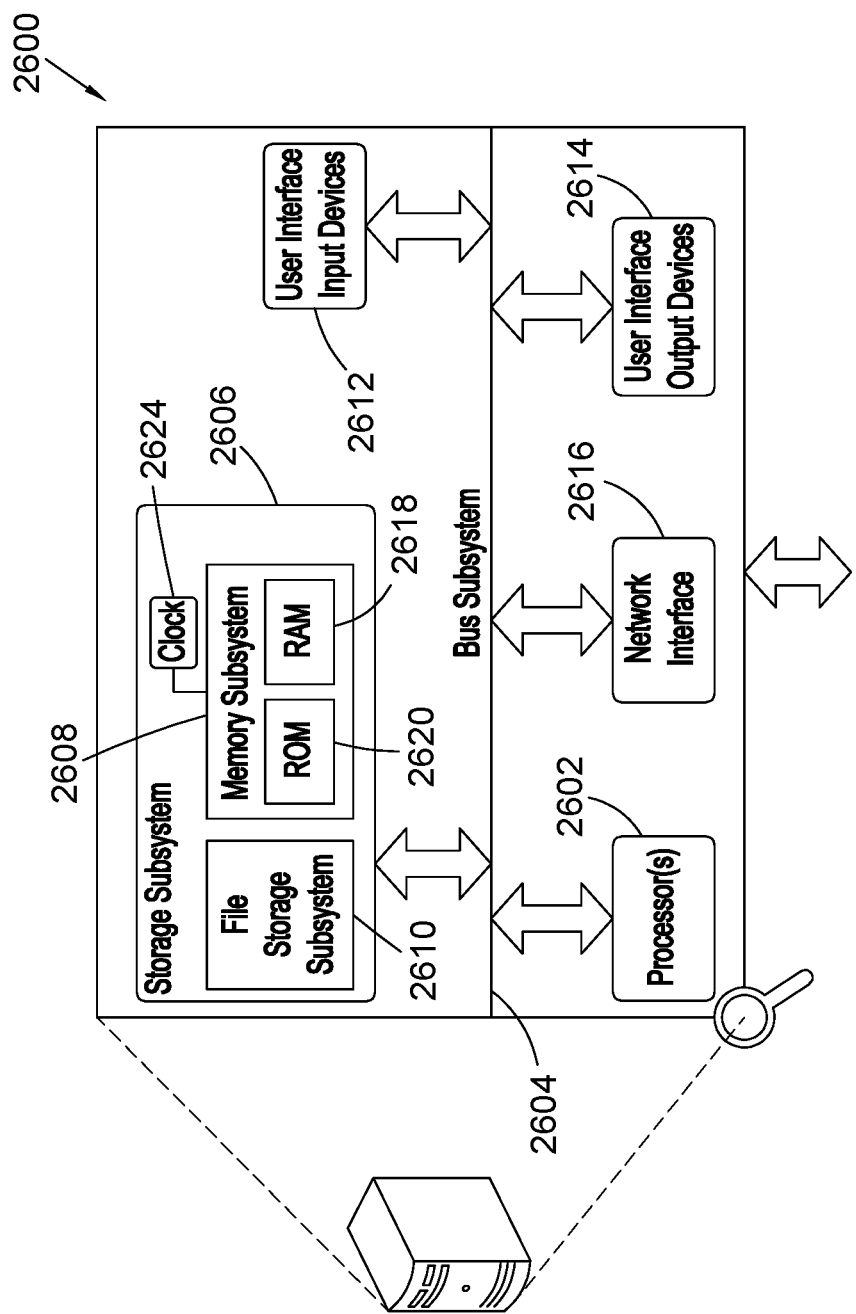

FIG. 5 is a schematic diagram illustrates a computing environment in which various embodiments can be implemented.

DESCRIPTION OF ILLUSTRATIVE EMBODIMENTS

Embodiments of the present disclosure provide methods and systems for the verification of an individual's identity. This may form part of a larger security process such as, for example, authorisation of a payment, or request for entry to a vehicle or building or some other controlled resource.

Figure 1:
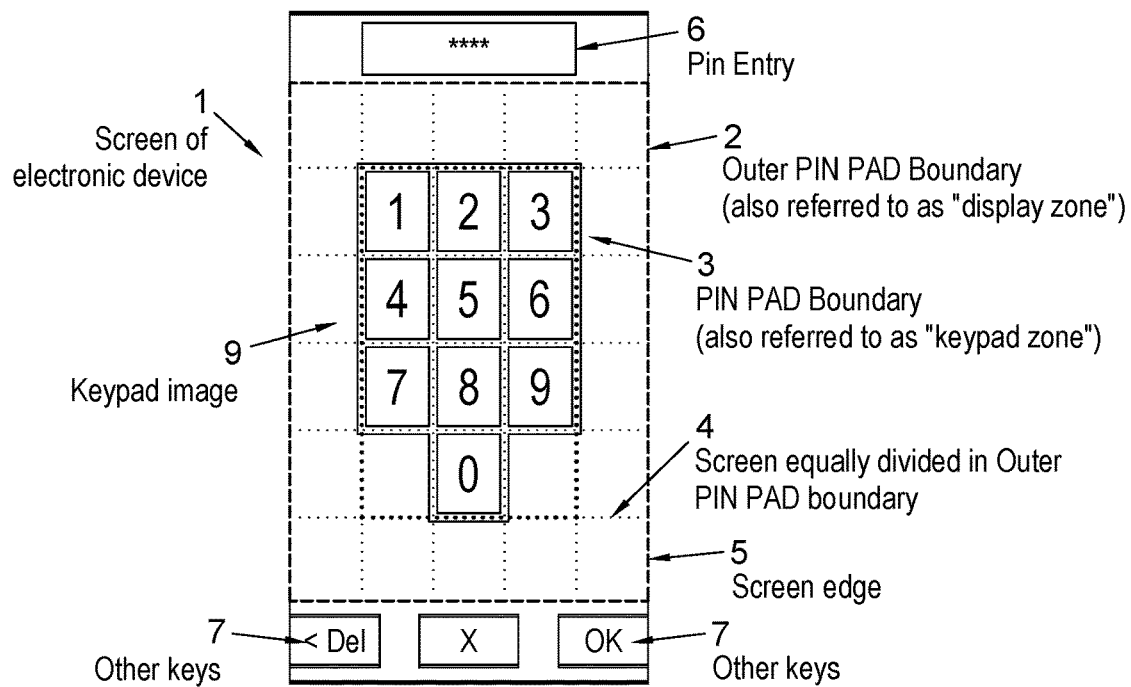
FIG. 1 shows an illustrative embodiment of the invention in use, including a keypad presented on the screen of an electronic device.

One or more embodiments of a method of the invention can be summarised as comprising the steps:
  i) Selecting and/or defining a keypad zone within an area of a display zone of an electronic device; preferably, the screen is a touch screen; in a preferred embodiment, the keypad zone is smaller than the display zone; in some embodiments, the display zone may cover the entire touch screen of the device, up to or towards at least one edge of the screen 5;
    In FIG. 1, the display zone is shown as the area surrounded by the outer PIN pad boundary 2 and indicated by the outer dotted line;
    the keypad zone is the area inside the outer display zone 2 and delimited by the inner dotted line 3, with a keypad shown within the keypad zone;
  ii) providing an operable, virtual keypad within the keypad zone of the screen of the device 1; the operable keypad is not shown in the figures as in use it is not visible to the user or an observer; The operable keypad comprises a plurality of hotspots which function as keys for the input of data into the device;
    providing an image 9, at least a portion of which depicts a keypad, and presenting the image in the display zone of the screen such that the depicted keypad is presented to a user within the keypad zone 3 of the device.
    Thus, the operable keypad and the portion of the image that depicts the keypad 9 are provided at the same location or area 3 within the display zone 2; the image of the keypad functions as a mask or cover which is visible to the user but the operable keypad is not visible, it is hidden from view by the image;
    the position of the keys shown in the image (item 9 of FIG. 4b) do not match the position of the corresponding key(s) in the underlying operable keypad such that a mapping is generated between the keys of the operable keypad and the keys depicted in the covering image; put another way, a key with a particular symbol (e.g. "3") is superimposed or overlaid by an image of a key with a different symbol (e.g. "7"); in use, when the user touches a portion of the screen which appears to be the "7" key, a "3" is entered into the device rather than a "7";
    this enables an encoded version of a user's data to be received by the electronic device, and an unencoded version of the data is never entered into the device's memory;
    In a preferred embodiment, the image covers the entire display zone 2. The portion of the image that does not depict the keypad may be blanked or blacked out, and are shown as blank white squares in FIG. 1 This may provide a margin or border within the image, around at least part of the image 9 which depicts the keypad. In another embodiment, a larger image may be provided over the operable keypad and then a separate keypad image provided over the top of the larger image.
  iii) repeating at least steps i) and ii) but with the operable keypad and the keypad image 9 provided at a different keypad zone 3 within the display zone 2 as illustrated by comparing FIGS. 2a, 2b, 3a, 3b.

In essence, then, the invention enables the operable keypad and the keypad image to move around the display/input zone of the screen between inputs or authentication sessions. As a different subset of hot spots (keys) are selected for provision of the operable keypad, this in effect moves the operable keypad to a different location relative to the display zone. The keypad depicted on the image also moves to the same, new location within the display zone so that it tracks the operable keypad. Thus, not only does the operable keypad move but the keypad depicted in the image also moves to the same area as the operable keypad. This requires a coordination of the locations of the depicted keypad 9 and the operable keypad.

This provides the advantage that if the device has been compromised by an unauthorised party, the movement of the operable keypad/keypad image relative to the screen prevents the use of known exploitations eg by use of an accelerometer. Thus, the invention provides an improved authentication solution and more secure device.

This is now described in more detail below with reference to FIGS. 1 though 4b.

Turning to FIG. 1, the screen of an electronic device is shown in accordance with one or more embodiments of the present disclosure. The screen 1 is a touch screen, and the device is a computing device such as a smart phone, or a tablet or a laptop computer etc. The display zone of the screen, referred to in FIG. 1 as the outer PIN PAD boundary 2, may cover the entire screen or a portion of it. In one or more embodiments, it may extend to one or more edges of the screen 5.

The display zone is divided up into a plurality of "hot spots" 8 as shown in FIG. 4. In a preferred embodiment, the hotspots form a grid which covers the entire display zone of the screen 4. In a preferred embodiment, these hot spots 8 are of equal size and format, and are adjacent one another, so that the display zone 2 is divided up into a grid of operable keys 8 that can be operated when user touches the screen because sensors detect the user's touch at that location. The labels or indicia associated with the operable keys 8 are not visible to a user or other observer of the screen. This can be achieved in a number of ways, such as covering them with an image that acts as a mask, or making the indicia/labels on the operable keys 8 the same colour as the background of the keys, or by simply not executing any code which causes key labels to be displayed. Hereafter, the terms "hot spot" and "operable key" may be used interchangeably.

When an authentication session is initiated, a location is determined for the keypad zone 3. In determining the keypad zone, a subset of (typically adjacent) hot spots is selected or chosen to provide the keypad zone 3. This is referred to as the Pin Pad Boundary 3 in FIG. 1. The keypad zone 3 is a smaller portion or subset of the larger display zone 2. Selection of the location for the keypad zone 3 can be performed deterministically or, preferably, by using a randomisation technique so that it is more difficult to ascertain where the keypad image 9 is to be displayed. The hotspots i.e. operable keys within the chosen keypad zone 3 form an "operable keypad".

An image is displayed within the display zone 2 of the electronic device such that it covers, masks and/or superimposes at least some or preferably all of the operable keys beneath. A portion of the image depicts a keypad. Thus, the larger image comprises a smaller image of a keypad. Put another way, the image comprises a depiction of a keypad 9, and the depiction of the keypad 9 may occupy only a portion of the overall image area such that the keypad depiction 9 appears to be surrounded by a margin. Preferably, the larger image is the same size as the display zone 2, and the location of the keypad image 9 within the larger image corresponds to the location of the chosen keypad zone 3 within the display zone 2. Thus, the image and the hotspots are provided on the same device and within the same display zone. This provides a more simple, efficient and secure arrangement compared to prior art arrangements.

The keypad image 9 depicts a plurality of keys 10 but these "keys" have no functionality, they are just part of the larger image. Thus, when a user presses a portion of the image corresponding to a "key" for his/her chosen input, an operable key at that location on the screen is caused to operate and enter an input into the device. In this way, the user operates the operable keys through or via the image. The image appears to the user as an operable keypad but in fact it is the unseen, hidden operable keys which cause the input to be entered into the device. The user does not know that there is a mapping which causes an encoded version of their input to be entered.

In FIGS. 1 to 4b, the image is shown as representing a non-scrambled keypad 9 of 4b. However, in one or more embodiments, the image may represent a scrambled keypad in which the order of the indicia are randomised or not in expected/continuous order i.e. scrambled. A mapping is provided between the position of the "keys" in the image and the operable keys of the virtual keypads to provide the desired encoding, so the underlying operable keypad may be scrambled or non-scrambled.

During use, the location of the keypad zone 3 relative to the display zone 2 of the screen 1 may stay in the same location for each of the user's keystrokes during an input/verification session, or may be re-located relative to the screen boundary 2 for each input. However, in a preferred embodiment, the keypad zone remains in the same location until the user has entered all characters of their verification identifier. If, for some reason, the input process needs to be repeated, or the next time an authentication session is initiated, a different keypad zone 3 is determined or selected and the keypad image 9 is therefore altered to provide the visible keypad depiction on the screen at a different location. For example, the position of the keypad zone 3 (and thus also the corresponding location of the keypad image 9 within the larger image) may be reset for each financial transaction that the user needs to enter their PIN for. The new keypad zone and corresponding new image give the impression that the operable keypad has moved.

Turning to FIG. 4a which shows a preferred embodiment, the possible values i.e. key labels are shown for each hotspot in the display zone. Note that in use these values or the hotspot grid would not be visible to an observer but are shown in FIG. 4a for the purpose of explaining the invention. Thus, the disclosure may comprise the step of determining the values associated with each hotspot.

The value entered upon selection of a particular hotspot is influenced, dictated or determined by the location of the keypad zone and corresponding keypad image within the display zone. The value to be entered by a given hotspot can be calculated by knowing the configuration of "keys" 10 depicted in the keypad image 9 and the position of the keypad zone 3/image 9 within the display zone 2. For example, if the keypad zone 3 is selected such that its top left corner corresponds or aligns with to the top left corner of the display zone 2 (as seen from FIG. 2a), the only value that the top left operable key can enter is a 1 as shown in FIG. 4. Operation of the next key to the right would input a 2, and the one to the next right would enter a 3. The remaining two keys on the top row of the hotspot grid are not within the keypad zone 3 and are not be covered by part of the keypad image 9.

However, if the keypad zone 3 is provided one hotspot to the right at the top of the display zone, then operation of the key at the top row, second from left of the screen would enter a 1 instead of a 2. The next key to the right would enter a 2 instead of a three and the key to the right again would enter a 3 rather than be blank or a random value. FIGS. 2b, 3a and 3b show the keypad zone in different locations within the larger display zone.

Thus, it can be seen that FIG. 4a shows the possible input values of each operable key 8 depending on where the keypad image is presented relative to the underlying hotspot grid.

Thus, for each operable key of the hotspot grid, there is a set of possible input values which comprises the values that may be inputted to the device upon operation of that given key, depending on where the keypad zone 3 and corresponding keypad image 9 are provided. At the start of an authentication process, the input value of a given key can be chosen at random from the set of possible input values shown at that location in FIG. 4a.

An advantage of this is that a malicious third party cannot predict where on the screen the keypad image 9 will be displayed. Therefore, they cannot guarantee which value from the set of possible input values is used when the user presses a location on the screen, because the attacker does not know where the keypad zone is. For example, depending on where the image 9 is presented during use, touching the screen at the middle ($3^{rd}$ from left) key of the third row could cause any digit from 1 through 9 to be entered. This makes it more difficult for the attacker to obtain the user's confidential identifier.

In a preferred embodiment, all hotspots in the grid 4 are active i.e. potentially operable during the identifier input process. However, keys which lie outside the keypad zone 3 are not visible to the user. This provides an indication to the user as to where the keypad zone is located and where they need to press.

In one or more embodiments, the input (keystroke) is received by the keyboard buffer of the device. In others, a Trusted User Interface (TUI) may be used. The input may be processed and/or stored within the electronic device in a secure area of memory. This may be a Trusted Execution Environment (TEE), Secure Element, HSM, TUI etc provided in or on the electronic device.

In one or more embodiments, the arrangement (i.e. "configuration" or "order") of the non-operable "keys" 10 shown in the image 9 does not match the configuration of the operable keys 8 below the respective image "keys" in the keypad zone 3, so that a mapping is generated between the two. Thus, when a user presses a portion of the image, an operable key at that location on the screen, with a different label from that shown in the corresponding location in the image, is caused to operate and enter an input into the device. The configuration of the "keys" in the image may be scrambled or altered in some way relative to a default configuration. As above, the user operates the operable keys through or via the image. The image appears to the user as an operable keypad but in fact it is the unseen, hidden operable keys which cause the entry to be inputted to the device. This means that an automatically encoded version of the user's desired or intended input is received by the device. It is automatically encoded in the sense that no post-input processing is needed to encode the user's input. An identifier (e.g. password or PIN) can be constructed from multiple keystrokes to form a multi-character, encoded identifier. This mapping provides a further layer of security and protection from unauthorised knowledge of the identifier. If the user presses a key outside the keypad zone 3, an erroneous input will be received by the device and the verification attempt will fail. Another verification session may be initiated to allow the user to try to authenticate again, preferably with the keypad zone in a different location relative to the screen's display zone 2. In one or more embodiments, the configuration of the operable keys 8 may be scrambled instead of, or in addition to, the configuration of the keys 10 depicted in the image 9. Thus, the disclosure may comprise the step of determining, providing and/or applying a configuration for the hotspots and/or image.

The encoded version of the user's input and/or constructed identifier can be decoded due to the mapping between the operable keys 8 and the "keys" 10 depicted in the image 9. This decoding may be performed by a further computing device separate or remote from the electronic device, such as a server. The encoded version may be encrypted or further encoded before being sent to the server. It may be sent as part of a payment request or authorisation message. The decoding process may be performed in a secure computing environment.

Upon decoding, the user's identifier may be compared to a stored version to determine whether or not the user has successfully authenticated. If the decoded identifier matches the stored identifier, the user's identity can be deemed to have been validated and access to the controlled resource may be granted. This may comprise unlocking the controlled resource. If they do not match, access may be prohibited. The authentication process may comprise part of a payment process, or may be part of a request to access a physical entity such as a building or vehicle, or for access to an electronic resource such as a network, a bank account, a computing device etc.

Preferred embodiments of the disclosure may be defined according to any or all of the following non-exhaustive clauses. Any feature described in relation to one aspect or embodiment may also be used in respect of one or more other aspects/embodiments. The invention may provide a security method, an authentication method and/or a secure data entry method.

Methods of the disclosure may comprise the steps:
  Providing an operable keypad within a keypad zone 3 of a display zone of a screen associated with an electronic device. This may comprise selecting or specifying a set of hotspots associated with the screen as operable keypad keys.

Selecting a/the keypad zone 3 within an area of a display zone 2 of a screen 1 of an electronic device, wherein the keypad zone comprises a plurality of operable keys 8.

Providing a keypad image 9 within a/the keypad zone such that a mapping i.e. correspondence is generated between a plurality of operable keys 8 and keys depicted in a keypad image 9.

Providing the same or a new operable keypad within a different keypad zone. This may comprise using and/or selecting a different set of hotspots associated with the screen as operable keypad keys.

The method may comprise any or more of the following steps:
  selecting the new keypad zone within a different area of the display zone and providing the same or a new keypad image within the new keypad zone
  Providing an operable keypad in a first keypad zone of keypad zone of an electronic device; and/or
  Providing a keypad image in the first keypad zone (either in part or entirety); and/or
  wherein the arrangement of the symbols associated with keys of the operable keypad and the arrangement of the keys depicted in the keypad image do not match, so that a mapping is generated between the operable keypad and the keypad image; and/or
  providing the same or a new operable keypad and the same or a new keypad image in a second keypad zone.
  Specifying or determining a configuration of symbols for the set of hotpots 8. One or more symbols, values or indicia may be associated with each hotspot 8 in the set. Operation of a particular hotspot may cause the/a symbol associated with the hotspot to be entered into the device.
  Calculating or determining an input to be entered into the device based on, or influenced by, the configuration of keys depicted in the keypad image and the position of the first and/or second keypad zone and/or first/second keypad image within the display zone.

Additionally or alternatively, embodiments may be described as re-drawing the operable keypad and the keypad image in a different location or area relative to the screen so that the image continues to be presented over the operable cover even after it has changed its location, and the keys depicted in the image continue to cover the hotspots of the operable keys.

There may be provided a secure data entry or authentication method comprising the steps:
  i) selecting a first keypad zone 3 within an area of a display zone 2 of a screen 1 of an electronic device, wherein the keypad zone comprises a first plurality of operable keys 8;
  ii) providing a keypad image 9 within the first keypad zone such that a mapping is generated between the plurality of operable keys 8 and keys depicted in the keypad image 9.

The method may comprise the step of providing the same or a new keypad image within a second keypad zone. The method may comprise the step of selecting the second keypad zone within or at different area of the display zone. There may be some overlap between the first and second keypad zones. The keypad zone may be smaller than the display zone and/or form a portion or subset of the display zone. The second keypad zone may comprise a second plurality of operable keys. The second plurality of keys may be in the same or a different configuration/layout from the first plurality. The mapping between the keys depicted in the keypad image and the first plurality of operable keys may be maintained or preserved when the same or a new image is provided in the second keypad zone, or a new mapping between the image keys and the operable keys may be provided in the second keypad zone.

Additionally, or alternatively, embodiments may be described as a secure data entry or authentication method comprising the steps:

providing a keypad image within a first area of a display zone of a touch screen associated with an electronic device, wherein:
  the display zone comprises a plurality of hotspots which function as operable keypad keys;
  the keypad image depicts a plurality of keys; and
  the locations of the keys depicted in the keypad image correspond to respective hotspots within the first area of the display zone, such that touching a key depicted in the keypad image causes the operation of a hotspot at that location within the first area;
and
displaying the same or a different keypad image in a second area within the display zone so that the locations of the keys depicted in the same or different keypad image correspond to respective hotspots within the second area of the display zone, and touching a key depicted in the same or different keypad image causes the operation of a hotspot at that location within the second area.

The step of moving the keypad image to the second area may be triggered by or performed as a result of a triggering event or condition e.g. start of a new authentication session, or the need to enter a new input, or the lapse of specified period of time etc.

The keypad image may be provided within the first and second areas of the display zone such that a mapping is generated between the hotspots and keys depicted in the keypad image. The keypad image may cover all or a part of the display zone. The keypad image may comprise a depiction of a keypad. The keypad image may be surrounded by a margin or border area.

Operation of a hotspot and/or entry of the data may be performed, at least in part, by the use of a virtual keypad or keyboard. This may be generated on the device by a procedure call which generates a virtual keypad object in memory on the device as known in the prior art.

Any feature described herein in respect of one aspect, embodiment or description may be applicable to other aspects or embodiments of the disclosure.

Turning now to FIG. 5, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 5, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The device may provide a secure environment for storing sensitive data and/or performing certain processes. Thus, the device may comprise, or be associated with, one or more portions or forms of secure memory. These may comprise a, TEE, Trusted User Interface, a Secure Element, a HSM etc.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 5 is intended only as a specific example for purposes of illustrating the preferred embodiment of the device. Many other configurations having more or fewer components than the system depicted in FIG. 5 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A secure data entry or authentication method comprising:
   i) selecting a first keypad zone within a display zone of a touch screen of an electronic device, wherein the first keypad zone comprises a first plurality of operable keys;
   ii) providing a first keypad image within the first keypad zone such that a first mapping is generated between the first plurality of operable keys and keys depicted in the first keypad image;
   iii) selecting a second keypad zone within the display zone, wherein the second keypad zone is different from the first keypad zone and comprises a second plurality of operable keys, the second plurality of operable keys being different to the first plurality of operable keys; and
   iv) providing a second keypad image within the second keypad zone such that a second mapping is generated between the second plurality of operable keys and keys depicted in the second keypad image,
   wherein the first and/or second plurality of operable keys in the first and/or second keypad zone respectively is a subset of a plurality of operable keys provided within the display zone;
   wherein each of the plurality of operable keys provided within the display zone corresponds to a respective hotspot provided on the touch screen and is associated with at least one respective indicia or symbol that will be entered into the electronic device when a touch input is detected at or within that hotspot;
   wherein the first and/or second plurality of operable keys in the first and/or second keypad zone respectively are masked, or partially/wholly hidden from view by at least a portion of the first and/or second keypad image and/or larger image, such that the at least one symbol or indicia associated with each operable key is not visible; and
   wherein the arrangement of the keys depicted in the first and/or second keypad image and the plurality of operable keys within the first and/or second keypad zone respectively do not match, such that when a user presses a portion of the keypad image, an operable key of the first and/or second plurality of operable keys at that location on the screen, with a different associated symbol or indicia from that shown in the corresponding location in the first and/or second keypad image, is entered as an input to the electronic device.

2. The method according to claim 1, further comprising:
selecting the second keypad zone within or at a different area of the display zone relative to the first keypad zone.

3. The method according to claim 1, wherein:
the second plurality of operable keys in the second keypad zone is a subset of a plurality of operable keys provided within the display zone.

4. The method according to claim 1, wherein:
the first mapping and the second mapping enables an encoded version of a user's input to be received by the electronic device.

5. The method according to claim 1, wherein:
the first and/or second keypad image forms part of a larger image or is presented on the screen over a larger image.

6. The method according to claim 1, wherein:
operable keys which are provided outside the first and/or second keypad zone are not visible to an observer.

7. The method according to claim 1, further comprising:
constructing an encoded identifier from a plurality of encoded inputs received from the user, into the device, via operation of an operable key through the first and/or second keypad image.

8. The method according to claim 1, further comprising:
using the first mapping and the second mapping to enable an input to be entered by the user into the electronic device by operation of an operable key through the first and/or second keypad image and/or larger image, wherein input is encoded in accordance with the mapping.

9. The method according to claim 1, further comprising:
using the first mapping and the second mapping to decode an input that has been entered by the user into the device by operation of an operable key through the first and/or second keypad image and/or larger image.

10. The method according to claim 1, further comprising:

using the first mapping and the second mapping to encode and/or decode an identifier to perform a verification step to verify the identity of a user; and permitting or preventing access to a controlled resource based on the outcome of the verification step.

11. The method according to claim 1, wherein:

at least one step of the method is performed using or within a trusted execution environment (TEE), a Trusted User Interface (TUI) or secure area associated with the processor or an alternative or additional processor.

12. A non-transitory computer-readable storage medium having stored thereon executable instructions that, as a result of being executed by a processor of a computer system, cause the computer system to perform the method of claim 1.

13. The method according to claim 1, wherein:

the first keypad zone and the second keypad zone are each smaller than the display zone and/or forms a portion or subset of the display zone.

\* \* \* \* \*